US005530326A

United States Patent [19]
Galvin et al.

[11] Patent Number: 5,530,326
[45] Date of Patent: Jun. 25, 1996

[54] BRUSHLESS DC SPINDLE MOTOR STARTUP CONTROL

[75] Inventors: John J. Galvin, Milpitas; Daniel E. Swiger, San Jose, both of Calif.

[73] Assignee: Quantum Corporation, Milpitas, Calif.

[21] Appl. No.: 94,484

[22] Filed: Jul. 19, 1993

[51] Int. Cl.[6] ................................................ H02P 6/02
[52] U.S. Cl. ............................................ 318/254; 318/439
[58] Field of Search ................................. 318/254, 138, 318/439, 696, 685

[56] References Cited

U.S. PATENT DOCUMENTS

| | | | |
|---|---|---|---|
| 4,639,798 | 1/1987 | Harrison et al. | 360/73 |
| 4,648,026 | 3/1987 | Petrick | 318/685 X |
| 4,858,044 | 8/1989 | Crapo | 360/99.08 |
| 4,876,491 | 10/1989 | Squires | 318/138 |
| 4,992,710 | 2/1991 | Cassat | 318/254 |
| 5,028,852 | 7/1991 | Dunfield | 318/254 |
| 5,057,753 | 10/1991 | Leuthold et al. | 318/254 |
| 5,198,733 | 3/1993 | Wright | 318/254 |
| 5,223,771 | 6/1993 | Chari | 318/254 |
| 5,223,772 | 6/1993 | Carobolante | 318/254 |
| 5,233,275 | 8/1993 | Danino | 318/254 |
| 5,254,914 | 10/1993 | Dunfield et al. | 318/254 |

OTHER PUBLICATIONS

Data Sheet, TLS2204 Voice–Coil Motor Driver, Spindle–Motor Driver and Voltage Monitor, Texas Instruments, Incorporated, Dallas Texas, Oct. 1992 pp. 1–22.

*Primary Examiner*—Brian Sircus
*Attorney, Agent, or Firm*—David B. Harrison

[57] ABSTRACT

Angular position of a polyphase brushless DC motor rotor is determined by the steps of generating a sequence of pulses with a programmed digital microcontroller, sequentially applying the pulses to selected ones of the plural windings or winding pairs, and sequentially measuring differential inductive coupling between the selected ones of the windings and selected others of the windings without rotating the rotor. Once angular position is determined, a multi-mode startup sequence is carried out to spin up the motor to a desired rotational velocity without any counter-rotation at startup.

9 Claims, 9 Drawing Sheets

BRUSHLESS DC SPINDLE MOTOR STARTUP CONTROL

FIELD OF THE INVENTION

The present invention relates to a method and apparatus for providing start-up control of a brushless DC spindle motor without use of separate rotor position sensors, such as Hall Effect sensors. More particularly, the new method and apparatus first detects rotor position, then generates an open-loop commutation sequence following an exponential curve, then switches over to back-EMF commutation at a crossover point, then qualifies back-EMF commutation values to eliminate noise during startup until operating speed is reached. The method is particularly useful in disk drives.

BACKGROUND OF THE INVENTION

Brushless DC motors enjoy widespread application. Such motors typically have a fixed stator structure comprising one or more phase windings, and a rotor structure typically including one or more permanent magnets providing fixed magnetic fields in close proximity to stator structure. Direct current is selectively switched to pass through the phase windings. Resultant electromagnetic fields induced by the windings interact with the fixed fields of the rotor in a manner resulting in a rotary force or torque which causes the rotor to rotate relative to the stator.

Commutation of brushless DC motors by reference to back-EMF induced in windings of the motor incident to its rotation without external position sensors is well known in the motor control art. One example of a method for controlling commutation of a DC brushless motor with back-EMF is provided by Leuthold et al. U.S. Pat. No. 5,057,753 entitled: Phase Commutation Circuit for Brushless DC Motors Using a Spike Insensitive Back EMF Detection Method. Unfortunately, back-EMF is only developed incident to motor rotation. When a rotor of the motor is at rest, back-EMF is not induced in the motor windings, and other methods must be employed for motor control during a startup sequence.

Some brushless DC motors are designed to provide very positive incremental angular detents or steps over a single rotation of the rotor. One way to provide positive detents is to employ an arrangement of stator gaps and magnetic poles of the rotor magnets such that positive detent positions are defined. Such motors, known as stepper motors, are frequently employed to provide incremental rotary motion or displacement in a controlled manner. One frequently encountered use of stepper motors is within head position actuators of disk drives, wherein each step or detent is used to locate a separate concentric data track on a rotating storage disk. When stepper motors are commutated over multiple detents, the detents tend to cause noise and vibration, and the rotary motion is subject to torque ripple or cogging.

Other brushless DC motors are used for such diverse tasks as small fans and spindle motors for rotating disks in disk drives. These applications require smooth rotary motion, and a number of techniques are known to minimize torque ripple or cogging. One example is provided in Crapo U.S. Pat. No. 4,858,044 entitled: Drive Spindle Motor with Low Cogging Torque. In that example, a disk drive spindle motor included a stator having nine evenly distributed windings formed over a laminar stator core with nine gaps or slots. The rotor included a radially polarized eight-pole magnet. An example of this prior art arrangement is shown herein in the diagrammatic sectional plan view of FIG. 1. By inspection of FIG. 1 it is apparent that the nine stator pole segments do not line up evenly with the eight fixed magnet poles throughout the annular extent of the rotor.

In disk drives it is important that disk rotation be started in the correct direction. Head sliders which fly above the data storage disk surface upon an air bearing incident to disk rotation are in contact with the disk surface at disk startup, and reverse rotation may cause the sliders to scratch or gouge the disk surface. More importantly, if a disk begins to rotate backwardly, the backward rotation must be sensed and stopped, and the disk then energized in a commutation pattern for forward rotation. In other words, reverse rotation increases the time required for disk spin-up and degrades the performance of the disk drive. The additional time required for disk spin-up becomes a very important factor for small battery operated portable computers, such as laptops and hand held devices. In battery powered computing devices, the disk drive only operates when needed, and frequent disk spin-ups occur as mass storage access may be needed during program execution.

Several prior approaches have been presented for determining the position of the rotor of a brushless DC motor at rest, so that a commutation pattern may be generated and applied in a sense assuring rotation in the desired direction. One example is given in Squires et al., U.S. Pat. No. 4,876,491 entitled: "Method and Apparatus for Brushless DC Motor Speed Control". This patent taught that a short current pulse was applied to each power phase of the motor, and that motor current conducted in the energized winding in response to each pulse was then measured across a sense resistor. The position of the rotor was determined in relation to the return pulse determined to be of greatest amplitude. A similar approach was proposed by Dunfield in U.S. Pat. No. 5,028,852 entitled: Position Detection for a Brushless DC Motor Without Hall Effect Devices Using a Time Differential Method. This latter patent teaches that rotor position at start of spinup may be determined by injection of short current pulses in different motor phases, each phase or pair of phases being energized first by a pulse of one polarity and then by a pulse of a second polarity. Rise time of each response was then measured by a timer and recorded in memory. Rise times of the positive and negative induced voltages in each winding were determined and then differenced, and the sign of the resultant time difference recorded. By performing these tests on each of the different phases or phase pairs, a table was developed which revealed the relative position of the rotor at startup. This method was capable of detecting arbitrary rotor position, and it differs from the first method by using differential current measurements of winding pairs and uses only the polarities of the six differential measurements performed upon the winding pairs of a three phase brushless DC motor.

Both of these prior rotor position schemes are premised upon measuring inductive reactance of the motor structure with respect to driving conditions at each winding or winding pair, and result in data enabling commutation for controlled directional rotation of the motor from rest. However, both are complicated and require special circuitry, such as the sense resistor in series with the current driving path.

Commonly assigned Harrison et al. U.S. Pat. No. 4,639, 798 entitled: Drive Having Two Interactive Electromechanical Control Subsystems describes a disk drive architecture employing a programmed microprocessor for direct commutation of a three phase brushless DC spindle motor for rotating data storage disks at a controlled rotational velocity. Hall effect sensors were employed to provide positional information to the motor control microprocessor. Startup was commanded by applying driving currents to the motor and monitoring the Hall effect commutation sensors to detect rotation. Once rotation was detected by the Hall sensors, a commutation algorithm was executed which provided driving currents sequentially to current sink amplifiers connected in series with the three phases of the spin motor and a common node positive power supply. This approach was quite simple, and made no effort to determine initial rotor position.

A later, more complicated approach for startup has been employed within a phase locked loop controller for controlling commutation of a brushless DC motor without position sensors. In this method, a commutation sequence is generated open loop at a relatively high commutation frequency. This sequence is applied to the non-rotating motor. At the same time a ramp control signal is applied to a voltage controlled oscillator within a frequency locked loop. The ramp control signal causes the commutation sequence initially to slow down to the point that the motor begins to rotate. Once rotation is detected by back-EMF, the slope of the ramp control signal is reversed, thereby causing the commutation rate to increase. A control loop is then frequency locked to the back-EMF signals and to a command signal. The frequency locked loop generates a speed error signal which is used to adjust the oscillator to cause the motor to reach, and operate at, its nominal rotational velocity. While this approach works well, in some instances it results in reverse rotation of the rotor, and it is complicated by the need for circuitry to generate the dual-slope ramp control signal.

Another drawback apparent in some motor controller designs has been insensitivity to certain noise-producing conditions occurring in the sensed back-EMF during spinup which lead to erroneous commutation and improper or inefficient operation of the brushless DC motor.

A hitherto unsolved need has remained for a method and apparatus for providing start-up control of a brushless DC motor without use of rotor position sensors, such as Hall Effect sensors in a simplified, reliable and elegant manner and at low cost., with a minimum of special hardware and with a minimum of firmware.

SUMMARY OF THE INVENTION WITH OBJECTS

A general object of the present invention is to provide a method and apparatus for controlling start-up of a brushless DC motor manifesting low cogging torque in a manner overcoming limitations and drawbacks of prior approaches.

A more specific object of the present invention is to provide a multi-mode spinup control method for use within conventional apparatus for commutating a brushless DC spindle motor.

Yet another specific object of the present invention is to sense rotor position at startup of a brushless DC spindle motor by utilizing back-EMF sensing connections provided by a circuit which uses those connections to commutate the motor after the startup sequence.

A further specific object of the present invention is to provide a low cost, efficient, reliable method for startup of a brushless DC spindle motor by using a programmed microprocessor during the startup sequence in supervision of a dedicated motor control circuit for commutating the brushless DC spindle motor and by using conventional back-EMF techniques to control the motor control circuit after startup.

Yet another specific object of the present invention is to generate with a programmed digital microcontroller a non-linear commutation ramp during a startup sequence for open loop commutation of a brushless DC motor to a cross-over point where switchover is made to closed loop commutation based upon sensed back-EMF.

In one facet of the present invention, a multi-mode control method for controlling startup of a polyphase brushless DC motor comprises the steps of:

determining with a programmed digital microcontroller the angular position of a rotor of the DC motor having a first plurality of permanent magnets and magnetic poles, and a stator having a core defining a second plurality of pole segments generally facing the magnetic poles and phase windings formed around the pole segments during a first operational mode, generating a non-linear commutation sequence for the phase windings of the DC motor with the programmed digital controller based upon determined angular position of the rotor in order to start rotation of the rotor in a forward direction without reverse rotation, and monitoring back-EMF induced in the phase windings to determine rotor angular position relative to the non-linear commutation sequence to determine a cross-over between rotor angular position and electrical phase angle of the commutation sequence, during a second operational mode, and generating a back-EMF commutation sequence with a motor controller from monitored back-EMF and commutating the motor with the back-EMF commutation sequence following the cross-over, during a third operational mode.

As a related aspect of this facet of the invention, the programmed digital microcontroller qualifies the back-EMF commutation sequence during an initial portion of the third operational mode, until a predetermined rotational velocity is reached, whereupon the programmed digital microcontroller ceases to qualify the commutation control to the motor controller.

As another aspect of this facet of the invention, the step of determining the angular position of the rotor is carried out by the steps of generating a sequence of pulses with the programmed digital microcontroller, sequentially applying the pulses to selected ones of the windings and sequentially measuring differential inductive coupling between the selected ones of the windings and selected others of the windings without rotating the rotor.

In yet another aspect of this facet of the invention, the step of determining the angular position of the rotor is carried out by the steps of:

sequentially applying with the programmed digital microcontroller a driving current pulse at a power level below a level overcoming starting friction of the rotor successively and bidirectionally to each of the windings as a driven winding during a driving interval, sequentially measuring with an analog to digital conversion means and the programmed digital microcontroller during a measuring interval immediately following the driving interval a response induced at a selected undriven winding of the core via inductive coupling of the stator core between the driven winding and the undriven winding, and determining with the programmed digital microcontroller the position of the rotor relative to the stator by identifying a driven winding and a current direction manifesting a lowest amplitude response in the selected undriven winding.

As another facet of the present invention, a multi-mode control method for controlling startup of a polyphase brushless DC motor comprises the steps of:

determining with a programmed digital microcontroller the angular position of a rotor of the DC motor having a first plurality of permanent magnets and magnetic poles, and a stator having a core defining a second plurality of pole segments generally facing the magnetic poles and phase windings formed around the pole segments during a first operational mode by the steps of sequentially applying with the programmed digital microcontroller a driving current pulse at a power level below a level overcoming starting friction of the rotor successively and bidirectionally to each of the windings as a driven winding during a driving interval, sequentially measuring with an analog to digital conversion means and the programmed digital microcontroller during a measuring interval immediately following the driving interval a response induced at a selected undriven winding of the core via inductive coupling of the stator core between the driven winding and the undriven winding, and determining with the programmed digital microcontroller the position of the rotor relative to the stator by identifying a driven winding and a current direction manifesting a lowest amplitude response in the selected undriven winding generating a non-linear commutation sequence for the phase windings of the DC motor with the programmed digital controller based upon determined angular position of the rotor in order to start rotation of the rotor in a forward direction without reverse rotation, and monitoring back-EMF induced in the phase windings to determine rotor angular position relative to the non-linear commutation sequence to determine a cross-over between rotor angular position and electrical phase angle of the commutation sequence, during a second operational mode, and generating a back-EMF commutation sequence with a motor controller from monitored back-EMF following the cross-over, including qualifying the back-EMF commutation sequence with the programmed digital microcontroller during a third operational mode until a predetermined rotational velocity is reached, and generating a back-EMF commutation sequence with the motor controller from monitored back-EMF without qualification by the programmed digital microcontroller after the predetermined rotational velocity is reached, during a fourth operational mode.

As another facet of the invention, a method is provided for determining the angular position of a rotor of a polyphase brushless DC motor for enabling startup in a forward direction of rotation without any reverse rotation. The motor includes a rotor having a plurality of permanent magnets and magnetic poles and a stator having a core defining a different plurality of pole segments generally facing the magnetic poles and phase windings around the pole segments. The core becomes nearly saturated by the presence of magnetic fields emanating from the magnetic poles in the absence of any driving currents in the windings. This method comprises the steps of:

sequentially applying a driving current pulse at a power level below a level overcoming starting friction of the rotor successively and bidirectionally to each of the windings as a driven winding during a driving interval thereby selectively to increase or decrease the level of magnetic saturation in the core, sequentially measuring during a measuring interval immediately following the driving interval a response induced at a selected undriven winding of the core via inductive coupling of the stator core between the driven winding and the undriven winding, the response being an inverse function of saturation level of the core, and determining rotor position relative to the stator by identifying a driven winding and a current direction manifesting a lowest amplitude response in the selected undriven winding.

As yet another facet of the invention, a method controls startup of a polyphase brushless DC motor and includes the steps of generating a commutation sequence having a rate following a non-linear ramp during a spinup interval. The sequence is applied to the phase windings of the DC motor with a programmed digital controller and a motor controller in order to start rotation of the rotor in a forward direction. Back-EMF induced in the phase windings is used to determine convergence of rotor phase lead with an electrical phase angle of the commutation sequence. Upon convergence, the motor controller generates a conventional back-EMF commutation sequence from monitored back-EMF for commutating the motor following convergence.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
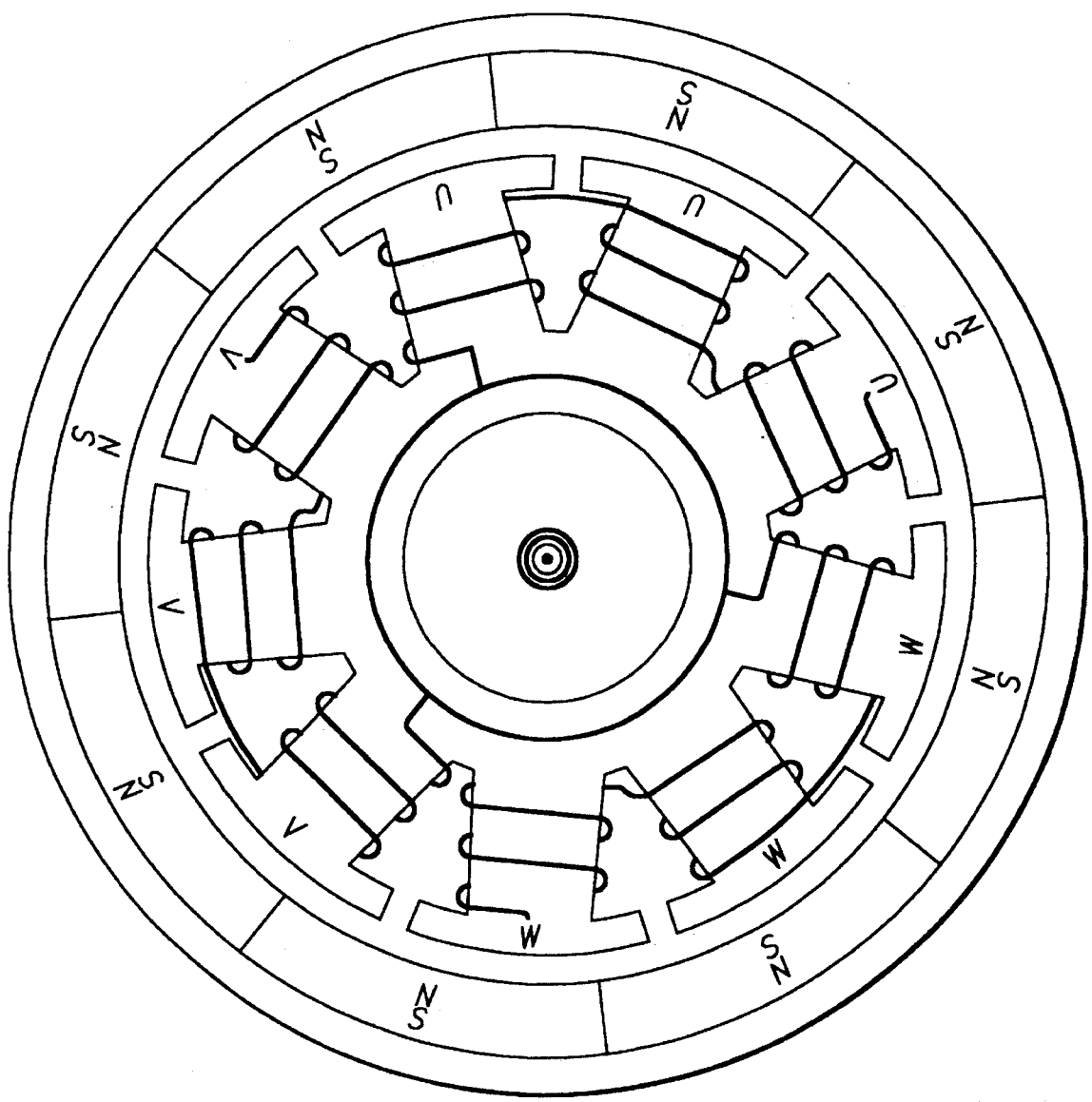
FIG. 1 is a highly diagrammatic plan view in section of a low cogging torque brushless DC motor of the prior art employing eight magnetic poles and nine stator pole pieces and gaps.

While FIG. 1 exemplifies a conventional eight pole, nine gap brushless DC spindle motor of the type frequently employed to rotate a disk spindle and storage disks in a hard disk drive, an appreciation of its various features sheds considerable light upon aspects of the present invention. The motor 10 includes a central post 12 secured to a drive base (not shown). A fixed stator structure 14, formed of laminations of e.g. magnetically soft steel alloy (i.e. low magnetic remanence), define nine pole pieces for nine coil windings. Nine gaps separate the nine pole pieces. In the FIG. 1 example, the coil windings are connected in series triads, three series windings comprising a phase U, three series windings comprising a phase V, and three series windings comprising a phase W. The triad of windings is connected in a star or Wye configuration, and a neutral tap or node CT is returned, along with connections to U, V and W to external driving circuitry, e.g. as in the connections shown in FIG. 3.

The motor 10 also includes a rotor 16 which is rotatable relative to the post 12 by virtue of bearings (not shown). In this preferred example 10, the rotor 16 is mechanically connected to a hub 17 to which one or more data storage disks 40 are mounted for rotation relative to the base. If multiple disks are present, they are conventionally mounted on the hub in a stacked, spaced apart relationship. The rotor 16 typically includes an outer annular flux return ring 18 formed of suitable ferromagnetic material, and a magnet 20. In this example, a permanent magnet annulus formed of high flux density material, such as a rare earth element e.g. neodymium, defines e.g. eight alternating magnetic pole segments oppositely facing the pole pieces of the stator 14 and the gaps between the pole pieces. While a continuous annular permanent magnet 20 is illustrated, the magnetic segments may be formed of separate magnets which have been arranged generally as shown in FIG. 1.

In accordance with aspects of the present invention, it will be appreciated by those skilled in the art that the stator 14 may be considered to be a common, high permeability core of a transformer including the windings U, V and W. Well designed spindle motors for disk drives, such as the motor 10 of FIGS. 1 and 3, typically provide the least amount of magnetic stator core 14 as possible, so that the number of turns forming each coil winding about each pole piece may be maximized in the design. Other designs provide a very high fixed flux level from a powerful annular permanent magnet of the rotor. In either situation, each magnetic pole of the rotor permanent magnet 20 facing the stator 14 develops a substantial magnetic field in each pole piece of the stator, tending to drive it into magnetic flux saturation. Driving currents passing through the coil windings U, V and W either add to, or subtract from the magnetic fields induced in the pole pieces of the stator 14 in a manner increasing or reducing the saturation level of the particular pole piece in relation to the permanent magnet field permeating it.

This increase or reduction in saturation level within the excited pole piece may be detected via inductive coupling at the undriven coil winding, because the common stator in actuality is a transformer core and couples a portion of the exciting flux from a driven winding pair into the undriven winding. It has been discovered by the inventors hereof that the efficiency of inductive coupling via the stator core 14 between a driven winding pair and the undriven winding of e.g. a three phase low-cogging brushless DC motor is directly related to the effect upon stator core saturation resulting from a driving current passing through the driven winding pair. If the driving current effectively reduces the overall saturation level of the stator core 14, the core 14 becomes more efficient as a transformer, and voltage induced via transformer action in the undriven winding will be larger. However, if the driving current effectively increases the overall saturation level of the stator core 14, the efficiency of the core 14 as a transformer is diminished, and voltage induced in the undriven winding will be smaller.

One driving condition for driving a particular winding with a current of a particular flow direction will result in the lowest voltage amplitude being induced in its corresponding undriven winding, which thereby identifies a stable equilibrium condition of the driving pair and which thereupon reveals rotor position within e.g. ±30 electrical degrees of rotation. When driving current in the proper flow direction is applied to a winding pair at an angular offset, e.g.. 120 electrical degrees, from detected location of the rotor 16, rotation of the rotor 16 in a desired direction is assured, and the possibility of reverse rotation is eliminated. Electrical degrees may differ from physical degrees of rotation of the motor. For example, an eight-pole motor has four complete electrical cycles within one full rotation of its rotor. Thus, in the case of an eight-pole motor, 30 electrical degrees equals 7.5 degrees of rotation of the rotor.

Figure 2:
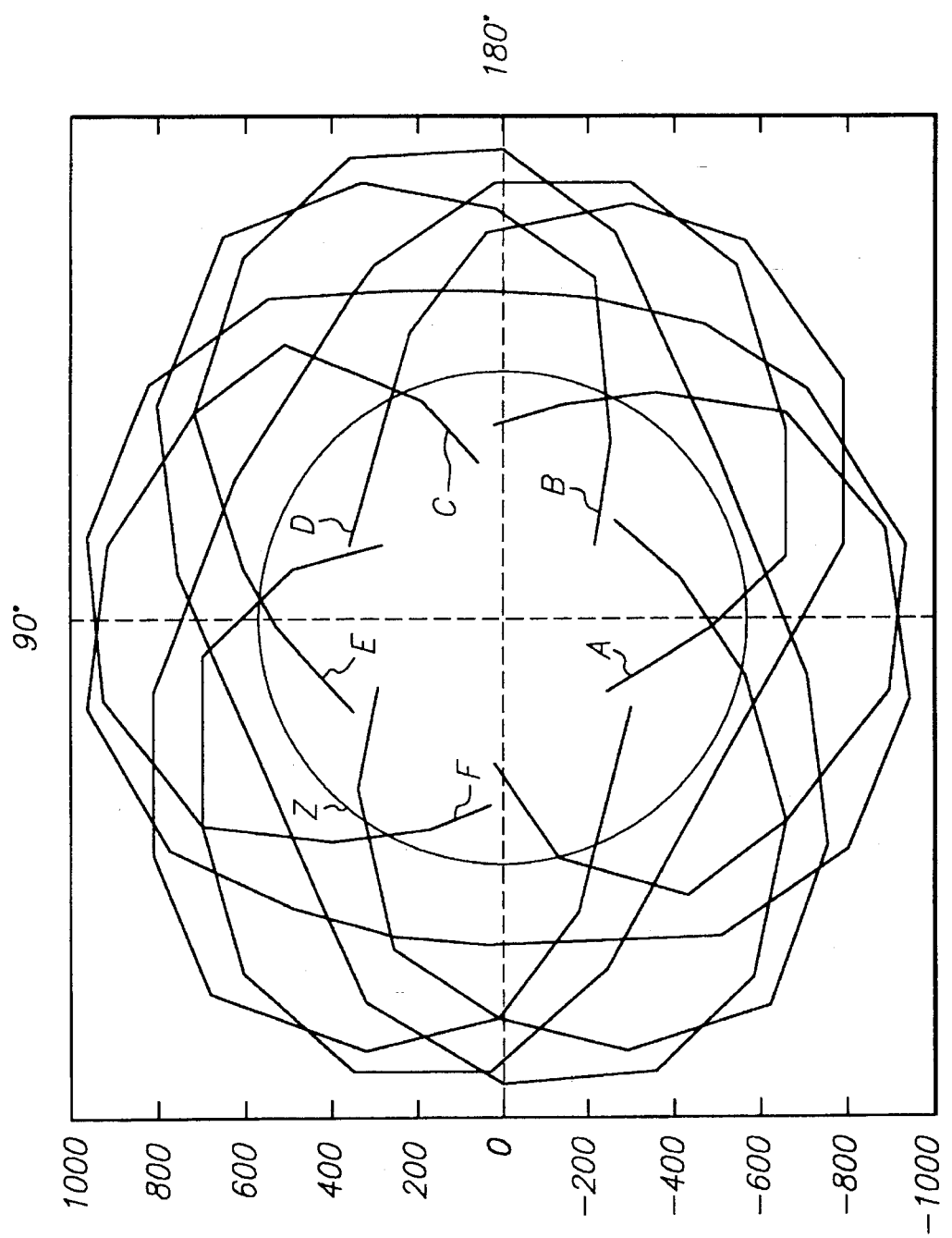
FIG. 2 is a polar graph of measured amplitudes of voltages induced in non driven windings by current changes occurring in driven winding pairs of a brushless DC motor, revealing stable equilibrium of one driven winding pair in function of angular rotation of a rotor of the motor, in accordance with principles and aspects of the present invention.

FIG. 2 is a polar plot of measured amplitude at the undriven winding for each of the six driving conditions as a function of rotor angular position. A low voltage zone within a circle Z provides identification the driving condition manifesting stable equilibrium. In FIG. 2 each plot represents one of the six driving conditions. For example, A may represent U>V as sensed at W. B may represent V>W as sensed at U; C may represent W>U as sensed at V, D may represent U>W as sensed at V, E may represent W>V as sensed at U; and F may represent V>U as sensed at W. The particular pattern will be a function of the interconnection arrangement and physical layout of the coils at the stator 14.

By a location of stable equilibrium of a driving pair, we mean that when an excitation current is passed through the coil pair, the sum of resultant reaction torque is zero. In FIG. 2, driving condition F is at stable equilibrium at rotor angle zero. At a rotation angle of 60 degrees, driving condition E is at stable equilibrium. At a rotation angle of 120 degrees, driving condition D is at stable equilibrium. At a rotation angle of 180 degrees, driving condition C is at stable equilibrium. At a rotation angle of 240 degrees, driving condition B is at stable equilibrium; and, at a rotation angle of 300 degrees, driving condition A is at stable equilibrium. By way of further example, in FIG. 1 the middle V winding equally spans the pole transition between North and South. This position represents a stable equilibrium location when V is the undriven winding, and when windings U and W are being driven as a winding pair.

Figure 3:
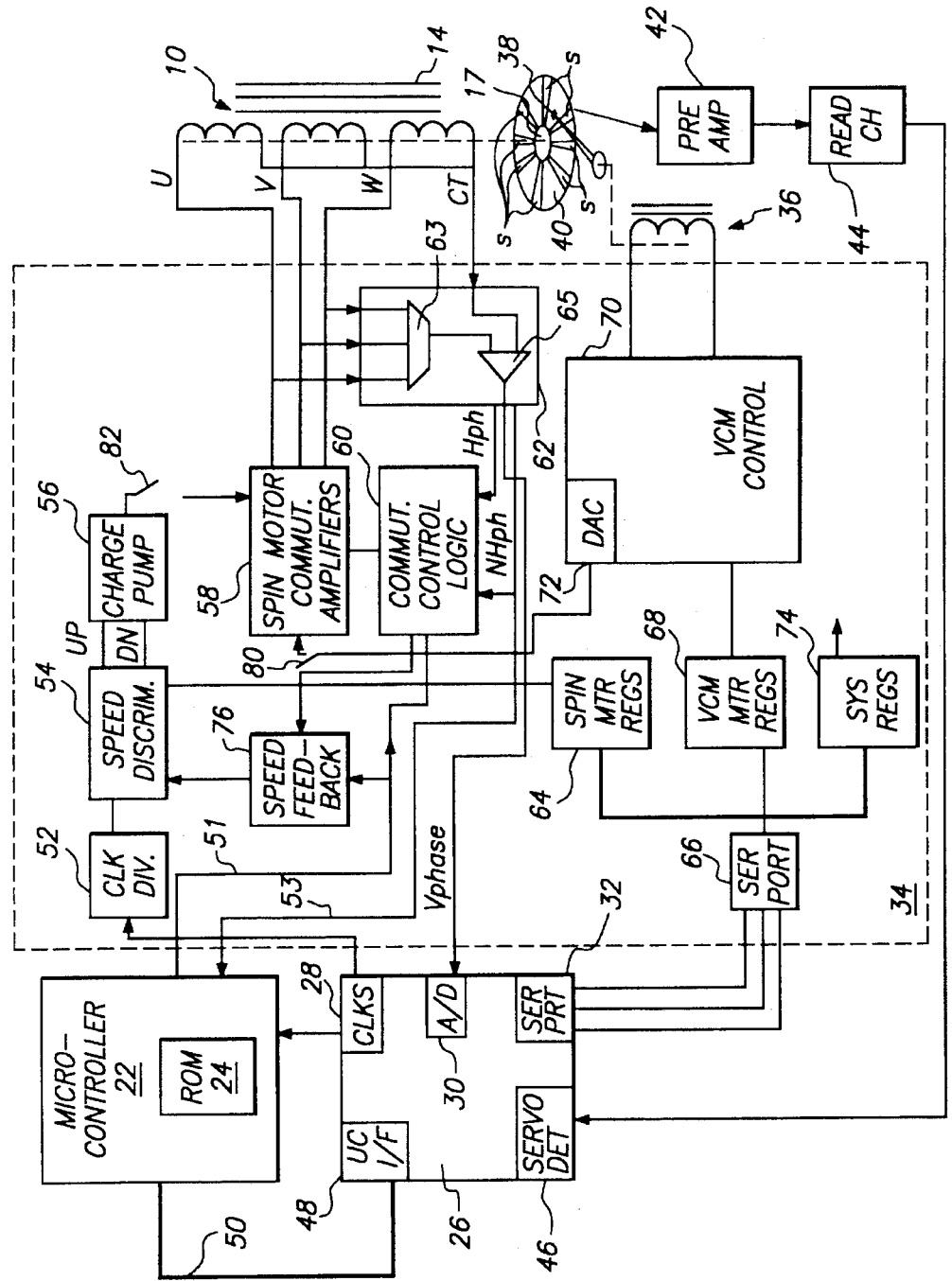
FIG. 3 is a block diagram of an exemplary hard disk drive apparatus including a brushless DC spindle motor which is operated in accordance with principles and aspects of the present invention.

Turning now to FIG. 3, a circuit is illustrated which implements principles of the present invention. The circuit essentially includes the eight pole, nine stator segment brushless DC motor 10 herein configured as a spindle motor for rotating a spindle hub 17 to which a data storage disk 40 is mounted. The circuit also includes a programmed digital microcontroller 22 such as an NEC 78352, or equivalent, and a motor controller chip 34. The microcontroller 22 include a read only memory (ROM) 24 which contains spindle motor spinup routines described hereinbelow. Other control firmware for controlling data storage and retrieval operations of the disk drive may be recorded on one or more concentric data tracks of the disk 40 and retrieved, after the disk is spinning at its nominal rotational velocity. A data transducer head 38 connects to a head select/write driver/ read preamplifier chip 42, which amplifies analog flux transitions induced in the head 38 during data reading operations, and passes the amplified analog signal to a read channel circuit 44, such as a type DP84910 Integrated Read Channel made by National Semiconductor, or equivalent.

One output from the integrated read channel 44 leads to a servo detector 46 within a disk drive electronics chip 26.

The chip 26 includes a master clocks circuit 28 which supplies appropriate clocking signals to the microcontroller, and to a motor clock divisor circuit 52 within a motor controller chip 34. The drive electronics chip 26 also includes an analog to digital converter having a multiplexed input, so that during a motor spinup sequence, a difference voltage induced in a non-driven winding of the three phase motor 10 is measured between the undriven selected phase U, V or W and the center tap CTS via a multiplexer 63 and a differential amplifier 65 within a phase selector circuit 62 of the motor controller chip 34. The measured difference voltage Vphase is converted into digital information by the analog to digital converter 30 and stored in a register within the electronics chip 26. A serial port 32 enables serial communications to be carried out between a similar serial port circuit 66 of the motor controller chip 34. The serial port 32 also includes a serial path (not shown) leading to the read channel 44 in order to pass control values thereto.

The servo detector circuit 46 decodes informational values which are prerecorded in servo sectors S which extend radially across the data storage disk 40. While only a few servo sectors S are shown on the storage surface of disk 40 in FIG. 1, in practice, there may be as many as 52 or more embedded servo sectors. Each sector includes a plurality of information which is decoded by the servo detector 46. Decoded values, including values indicating detection of a once per revolution index signal recorded in one of the sectors, are stored in registers of the electronics chip 26.

The chip 26 also includes a micro-controller interface 48. An address/data bus structure 50 extends between the microcontroller 22 and the interface 48. The interface 48 enables the microcontroller 22 to access the registers of the circuit 26 as external I/O memory space. Accordingly, the firmware routines executed by the microcontroller 22 may cause control values to be loaded into registers of the electronics chip 26 and then passed over the serial port 32 to the motor controller circuit 34 or to the read channel 44, as needed.

In connection with the present invention, there are two important digital lines between the microcontroller 22 and the motor controller 34. One line is a commutation-advance line 51. Every time the microcontroller 22 pulses the commutation-advance line 51, the motor controller 34 will advance its commutation state from one winding pair to the next, in a predetermined commutation order. The following table sets forth a presently preferred pattern of six commutation driving states for driving the three windings U, V and W of the FIG. 1 motor 10. Each state is reached in sequence by toggling of the commutation line 51 under firmware control:

TABLE

| U | V | W |
|---|---|---|
| + | − | off |
| off | − | + |
| − | off | + |
| − | + | off |
| off | + | − |
| + | off | − |

A second line 53 feeds each back-EMF pulse detected by a back-EMF phase selector circuit 62 of the motor controller back to the microcontroller 22, so that it may monitor the time of occurrence of each back-EMF pulse. This line accordingly informs the microcontroller 22 when the motor controller 34 has determined a switch over point appropriate for switching over to the next pair, based upon its detection of back-EMF. The microcontroller 22 monitors this back-EMF monitor line during a commutation qualification operational mode during the spin-up sequence, so that spurious back-EMF commutation signals attributable to noise or to anomalies of the circuit 34 in relation to the particular spindle motor 10 (such as circuit resonances, etc.) may be blanked by the microcontroller 22, thereby providing a digital low pass filtering function to the motor controller 34. As already mentioned, the analog to digital converter 30 within the drive electronics chip 26 converts the sensed back-EMF from each selected undriven phase into a digital value, and provides the value to the microcontroller 22 via a register in the electronics chip 26.

The motor controller chip 34 includes a frequency locked loop for controlling motor commutation and motor speed. The motor clock divisor circuit 52 generates a reference motor velocity signal and supplies the signal to a speed discriminator circuit 54. Also supplied to the speed discriminator circuit 54 is a speed feedback signal from a speed feedback multiplexer circuit 76. During rotation commutated by back-EMF, the speed feedback signal is generated from back-EMF sensed at the motor 10 and represents present rotational velocity of the motor 10. The speed discriminator 54 compares the reference motor velocity signal with the speed feedback signal and generates one of two error signals. One error signals, UP, is applied to increase a charge stored in a charge pump 56. Another error signal, Dn, is applied to decrease a charge stored in the charge pump 56. The charge pump 56 controls a voltage reference applied to control the current applied by spin motor commutation amplifiers of a circuit 58 to the windings U, V and W of the motor 10. As the voltage reference is increased, the drive current increases, and the motor 10 speeds up. As the voltage reference is decreased, the current decreases, and the motor 10 slows down.

The frequency locked loop including the charge pump 56 is closed when commanded by the microcontroller 22. The microcontroller 22 commands switchover to the frequency locked loop with a control value written to a system registers bank 74 of the motor controller 34 via the serial port. The control value closes a switch 82 from the charge pump 56, and opens a switch 80 leading from a digital to analog converter 72 of a voice coil driver and control circuit 70, also a part of the motor controller chip 34. The voice coil motor (VCM) control and driver circuit generates control signals which are applied to a voice coil winding of a rotary actuator structure 36 which positions the data transducer head 38 relative to the concentric data tracks formed on the data storage disk 40. When the motor controller 34 is being commutated directly by the microcontroller 22 during the initial spinup control modes, the microcontroller 22 writes a DAC control value into a voice coil motor registers bank 68 which then sets a voltage level on the path leading through the switch 80 to the spindle motor amplifiers 58.

Each undriven winding of the three-phase motor 10 is selected by the multiplexer 63 at the back-EMF phase selector circuit 62 and a voltage difference is developed across the selected undriven winding and the centertap line CTS by the differential amplifier 65. This voltage difference value Vphase is passed to the analog to digital converter 30 via the Vphase line. The analog to digital converter 30 then converts the Vphase difference voltage into a value for processing by the microcontroller 22.

The system control registers bank 74 also supports values for selectively powering up the motor controller chip 34. The back-EMF gain may also be controlled by a value written to this register bank 74. The spindle power amplifiers are also enabled by writing to this bank, and the commutation control COMM is also commanded by writing a value to this register bank.

The motor controller circuit is preferably implemented as a type TLS2204 voice-coil motor driver, spindle-motor driver and voltage monitor circuit made by Texas Instruments, Incorporated, or equivalent.

Figure 4:
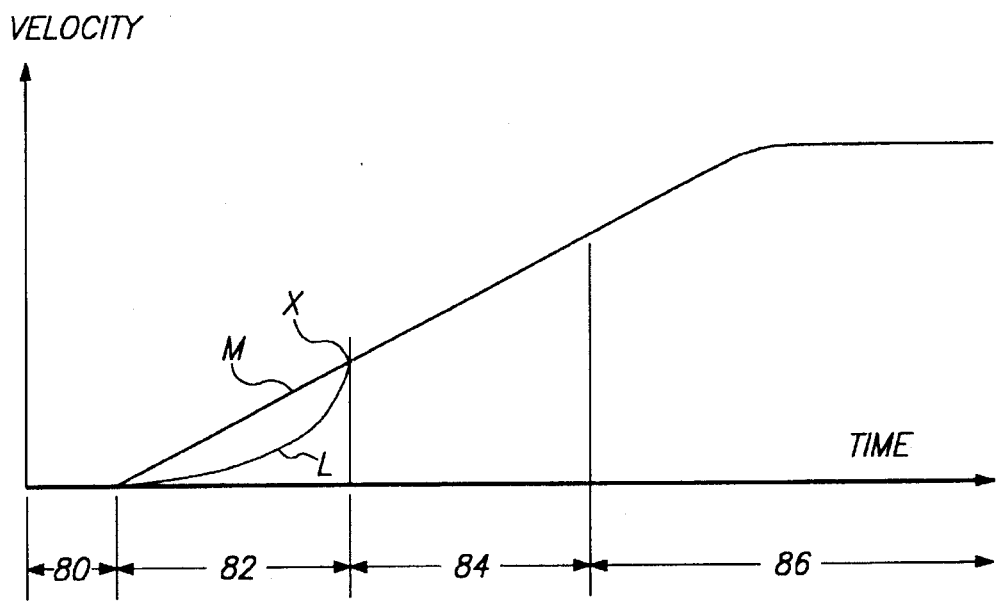
FIG. 4 is a graph of rotational velocity of the FIG. 3 brushless DC spindle motor, illustrating four control modes in accordance with principles of the present invention.

FIG. 4 plots rotational velocity M of the spindle motor 10 over time and illustrates four progressive, sequential modes 80, 82, 84 and 86 which are implemented to control the spindle motor 10 in accordance with principles of the present invention. The first mode 80 determines rotor position while the rotor is at rest. The second mode 82 generates an initial commutation sequence at a rate following a non-linear curve, denoted by L in FIG. 4.

As shown in FIG. 4, once rotor position has been established at mode 80, driving current sequences, starting at a particular winding determined by rotor position, are applied to the spindle motor 10. Once initial starting friction forces are overcome, motor velocity M (and motor rotor phase) quickly leads the commutation rate commanded by the microcontroller 22 in accordance with the curve L. While the rotor is substantially ahead of the electrical commutation angle, and the motor 10 is operating inefficiently, the initial rotational mode 82 has a primary task of accelerating the rotor to a velocity at which the back-EMF detection circuitry 62 begins to operate adequately. Since the back-EMF circuitry 62 is quite sensitive to how far the rotor is ahead of the electrical commutation signal being commanded by the microcontroller 22, control switchover to the motor controller phase locked loop cannot happen smoothly until the electrical commutation signal converges with rotor position, as shown at point X in the FIG. 4 graph.

The non-linear commutation ramp L is provided in order to avoid "load oscillation" at the spindle motor. Load oscillation occurs when the motor rotor alternately leads the electrical commutation angle by greater and lesser amounts, and results in a very uncontrolled situation. The non-linear commutation ramp L is monotonic and is shaped to supply an increasing amount of power to the motor 10 along a path below the linear acceleration ramp as shown in FIG. 4 below the crossover point X. The non-linearity stems from the fact that the motor 10 manifests a low inertia, and low friction, once the head 38 is airborne and is flying upon the air bearing just above the storage surface of the now-rotating disk 40. The particular characteristics of the motor 10 are determined, and the initial slope of the commutation ramp L is then tailored to be less than the acceleration ramp slope of the worst case motor, given normal manufacturing tolerances.

The convergence of rotor position and the electrical commutation angle at the point X of FIG. 4 may be determined by the microcontroller 22 by monitoring the sensed back-EMF induced in one undriven winding immediately before commutation switchover and by monitoring sensed back-EMF induced in the next undriven winding immediately following switchover. If these two voltages are the same, the electrical commutation angle has converged with the actual commutation angle (rotor position). However, if there is a sensed voltage difference at the commutation switchover point, a rotor phase lead or phase lag is present, determined by the sign of the difference.

Since the microcontroller 22 supplies the commutation signals via the line 51 during the mode 82, it can obtain back-EMF samples just before and just after each commutation switch point, even though the motor 10 is being driven in an open loop fashion in this mode. By detecting the cross-over point X, and by switching commutation over from firmware control to the phase locked loop of the motor circuit 34, the loop generates and uses a smooth triangular waveform based upon detected back-EMF commutation points, and works effectively thereafter in the mode 84 to continue to accelerate motor velocity until the nominal operating velocity is reached.

While the microcontroller 22 is no longer directly commutating the spindle motor 10 during the mode 84, it continues to supervise motor acceleration in an active manner. The motor controller 34 provides the microcontroller 22 via the path 53 with a pulse at each switchover point detected by the back-EMF phase selector circuit 62. The microcontroller 22 monitors this pulse. There are some times when this pulse may represent a noise spike or glitch and represent a false commutation indication, during certain low speed ranges of the spin motor 10. Accordingly, the microcontroller 22 performs a debounce routine by generating a time window during which a valid commutation pulse is expected. If the pulse is received during the time window established by the microcontroller 22, it echoes the pulse back to the commutation control logic circuit 60 over the path 51. However, if the pulse arrives outside of the time window, it is deemed spurious and is not echoed back to the commutation control logic circuit 60 by the microcontroller 22. After a certain velocity is reached, it is safe for the microcontroller 22 to withdraw from active control of the commutation process, and it does so at mode 86 in FIG. 4, during which the motor controller 34 takes the motor 10 up to its nominal velocity.

During ongoing disk drive operations, which may commence following spinup of the disk 40 by the spindle motor 10, the servo sectors s are read by the head 38 and decoded by the servo detector circuit 46. If a timing discrepancy indicating incorrect spindle velocity is detected at the servo detector, the microcontroller 22 may command the motor controller chip 34 to reset itself. Also, during the initial startup mode 82, in the event that the spindle motor 10 does not begin to rotate, due to excessive stiction (starting friction) between the head 38 and the disk 40, a controlled vibration command (dither) sequence may be generated by the microcontroller 22 and applied to the voice coil control circuitry 70 via the VCM motor registers bank 68 to cause the actuator structure 36 to move back and forth in an attempt to overcome the stiction and free the disk for rotation. Simultaneously, initial driving currents are applied to the spindle motor 10 by the microcontroller 22 to start rotation. This process continues until rotation is detected by sensing of back-EMF by the microcontroller 22 via Vphase magnitude at the analog to digital converter 30.

Figure 5A:
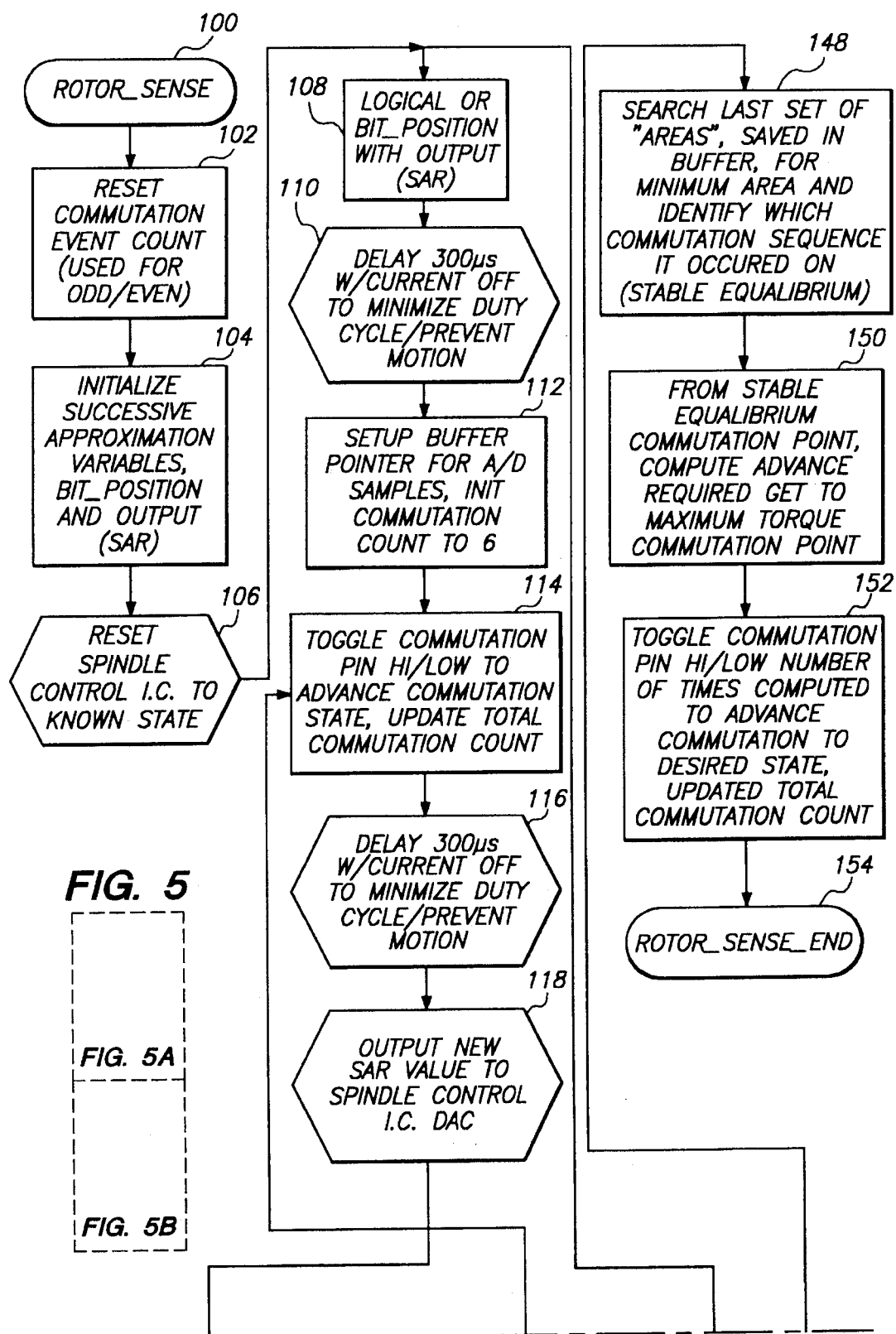
FIGS. 5A and 5B provide a flow chart of a rotor sensing algorithm in accordance with principles of the present invention.
Figure 5B:
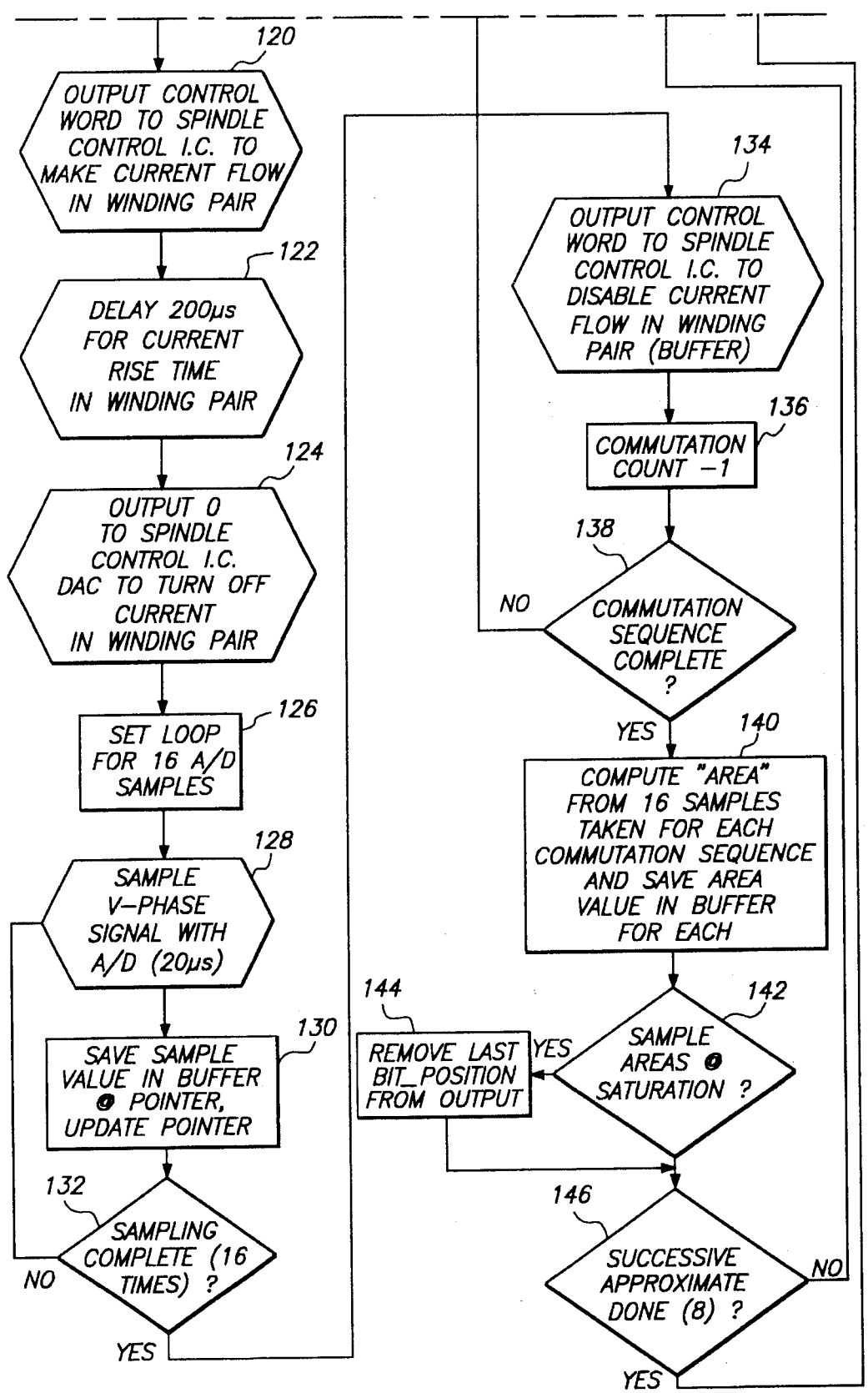

FIGS. 5A and 5B together set forth a flowchart of firmware steps performed during the initial operating mode 80 during which rotor position is determined. The rotor sense routine 80 is entered at a step 100. A step 102 resets a commutation event counter. A process step 104 then initializes a successive approximation process which is implemented to be sure that a reliable measurement may be obtained with the least amount of driving current being applied to the rotor. Bit position variables and a variable establishing an initial current level at the DAC 72 to be applied during the rotor sense routine 80 is also set at step 104. A step 106 then resets the motor controller chip 34 to a known state. The bit position set at the step 104 is then ORed with a successive approximation output from a step 146 (FIG. 5B) at a step 108 as pad of a successive approximation process. A step 110 then causes a 300 microsecond delay with spindle motor current off in order to minimize the duty cycle of the driving pulse applied to the first selected winding and thereby preclude inadvertent rotation of the rotor. A step 112 sets up a buffer pointer so that the first digitized value from the analog to digital converter 30 will be stored at a known position in memory space. The step 112 also sets a commutation sequence counter to 6.

A step 114 toggles the commutation line 51 in order to advance the commutation state of the commutation control logic 60 from an initialization state to a first commutation sequence, i.e. a particular driven winding pair and current flow direction as shown in the TABLE above. The commutation sequence count is also decremented by one at the step 114. A step 116 then sets up a 300 microsecond delay with the current off in order to minimize the duty cycle and prevent rotation. The successive approximation value updated at the step 108 is then put out to the DAC 72 which causes a current pulse of controlled power level and direction to be applied to the first driven winding pair. A control word is then put out at a step 120 to the motor controller circuit 34 to cause current to flow in the first driven winding pair. A step 122 causes a 200 microsecond delay to ensue while current is flowing, so that current will rise sufficiently in the driven winding pair of this particular commutation sequence to create a sufficiently robust additional magnetic field in the core 14 to result in a voltage being induced in the undriven winding of this particular commutation sequence. A step 124 turns off the current in the selected phase winding pair after 200 microseconds by turning off the current control DAC 72. A step 126 then immediately starts a loop for acquiring 16 analog to digital samples at the analog to digital converter 30.

A step 128 then causes the analog to digital converter to obtain and convert the first one of 16 samples, each being taken during a 20 microsecond sampling window, immediately following removal of driving current at the step 124. The first digitized sample value is then saved at a step 130 in the buffer memory at the storage location pointed to at the step 112. The buffer memory pointer is also incremented to the next available storage location. A logical node 132 determines if all 16 samples for this particular commutation sequence have been acquired and are stored in the buffer. If not, a return is made to step 114, and steps 128 and 130 are repeated, until all 16 samples for the particular commutation sequence have been obtained within the present approximation and recorded in the buffer memory. Once the 16 samples are recorded, a step 134 puts out a control word to the motor controller 34 to disable current flow through the present winding pair. A step 136 then decrements the commutation sequence count by one, and a logical node 138 determines if the commutation count has reached zero, meaning that all six commutation sequences have been measured. If not, a return is made to step 114, and steps 114 through 136 are repeated for the next commutation sequence.

A step 140 then computes the area from the 16 samples taken for each commutation sequence and saves an area value in the buffer memory for each of the six commutation sequences. A logical step 142 determines if the sample areas are at a saturation level. If so, a step 144 removes the last bit position from the sample area output determined to be at saturation. A logical node 146 then determines if a successive approximation process is completed. This determination is based upon whether the area values lie within an acceptable range. If not, a return is made to the step 108, and the steps 108 through 144 are repeated, with a larger driving current being commanded at the DAC 72 by virtue of steps 108 and 118.

Once it is determined that the successive approximation process is completed, a step 148 searches the last set of areas saved in the buffer from each of the commutation sequences in order to determine a sequence having a minimum area. Once identified, this sequence establishes a stable equilibrium point. A step 150 then determines which commutation sequence should be energized for assured rotation in the desired direction. A step 152 then toggles the commutation line 51 of the motor controller chip 34 until the desired commutation sequence state is reached, and a variable indicating commutation sequence count is updated. Typically, the desired commutation sequence will be 120 degrees ahead of the sensed stable equilibrium state of the rotor. The rotor position sense routine 80 is then ended at a step 154 which marks a return to a main firmware program routine.

Figure 6:
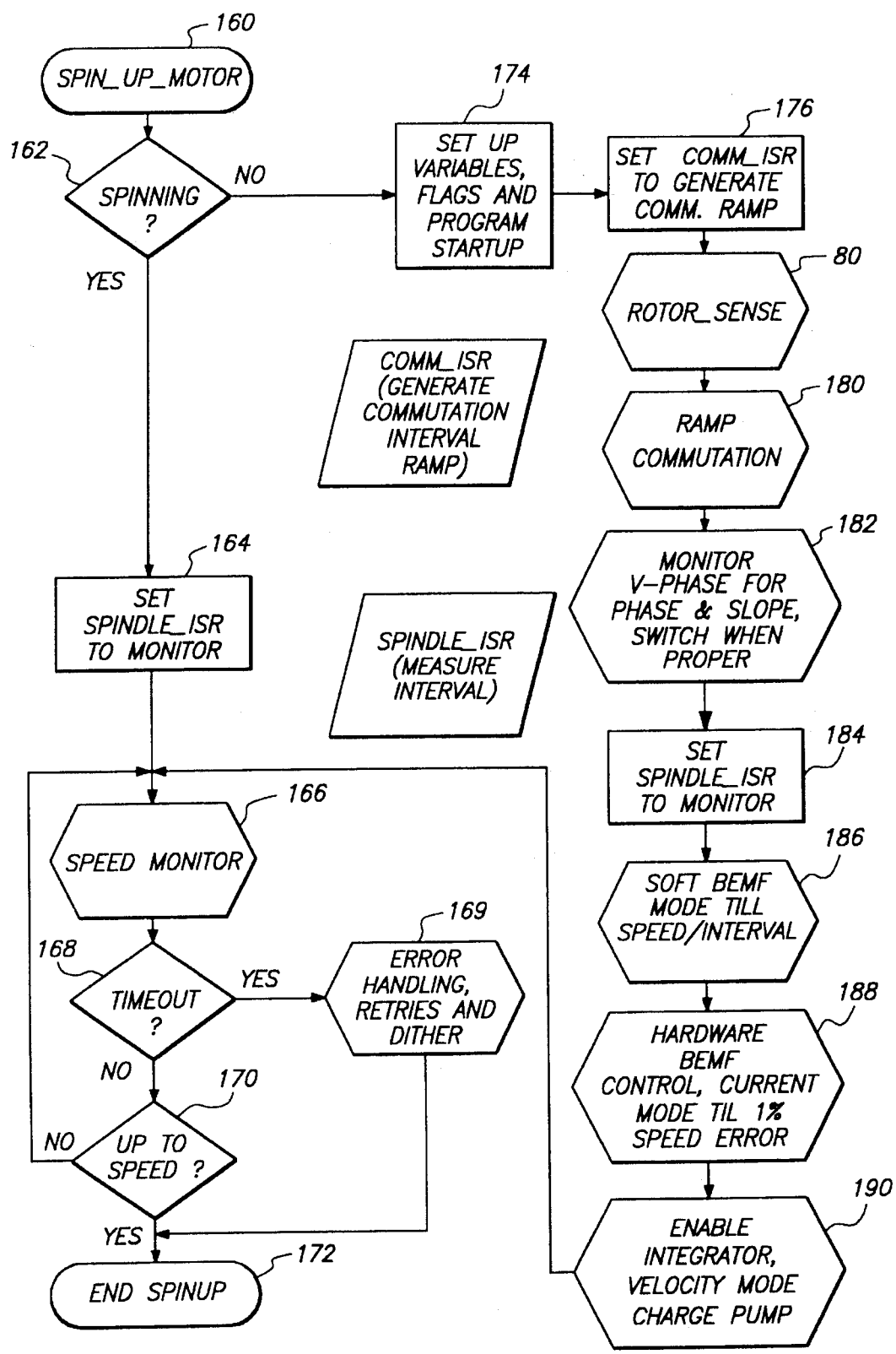
FIG. 6 is a flowchart illustrating overall startup sequencing of the FIG. 3 apparatus in accordance with principles of the present invention.

FIG. 6 provides an overview of a spindle motor start and control routine 160 of which the FIGS. 5A and 5B rotor position subroutine 80 is an integral part. The routine 160 first determines whether the rotor is spinning at a step 162. If so, a spindle monitor routine 164 (FIG. 7) is called and is set to monitor rotational velocity of the motor 10 at a step 166. Whether or not the motor 10 is spinning, a logical node 168 determines if a time-out has occurred. If so, a step 169 handles errors, performs retries and commands the dither routine, in an effort to initiate rotation of the motor 10. A logical node 170 then determines whether the motor is rotating at its nominal velocity. If so, the spinup routine is ended at a step 172, and the microcontroller 22 is free to perform other tasks. If not, a return is made to step 166, and steps 166–170 are repeated.

If the logical node 162 determines that the motor 10 is not spinning, a step 174 sets up variables and flags needed to start up the motor 10 and begins program startup. A step 176 sets up a commutation interrupt service routine which will generate the non-linear commutation ramp L graphed in Fig. 4 during the first rotational mode 82 of motor operation. Rotor position is then sensed by the sense routine 80. The ramp commutation mode 82 then begins at a step 180 which causes the commutation routine 176 to begin generating and applying the non-linear commutation ramp L to the motor controller 34 by setting a current level at the DAC 72 and then by progressively toggling the commutation line 51 at a rate following the non-linear curve L of FIG. 4. As the ramp is being generated and put out, a step 182 monitors back-EMF on the Vphase line via the A/D 30 before and after each commutation command pulse is put out on the commutation path 51 until the cross-over point X is reached along the acceleration ramp of FIG. 4.

Once the cross-over point X is detected, a step 184 enables the spindle speed monitor interrupt service routine 164 which monitors rotational velocity of the spindle motor, based upon an internal commutation sequence command signal generated within the motor controller chip 34 by the back-EMF phase selector circuit 62, via the line 53. This soft back-EMF process 186 continues during FIG. 4 mode 84 until a control cutover velocity is reached at the beginning of the hard back-EMF process 86 is reached at a step 188. When the motor 10 has reached its nominal velocity within one percent error, the phase locked loop of the motor controller circuit 34 is enabled at a step 190, and program control progresses to the step 166.

Figure 7:
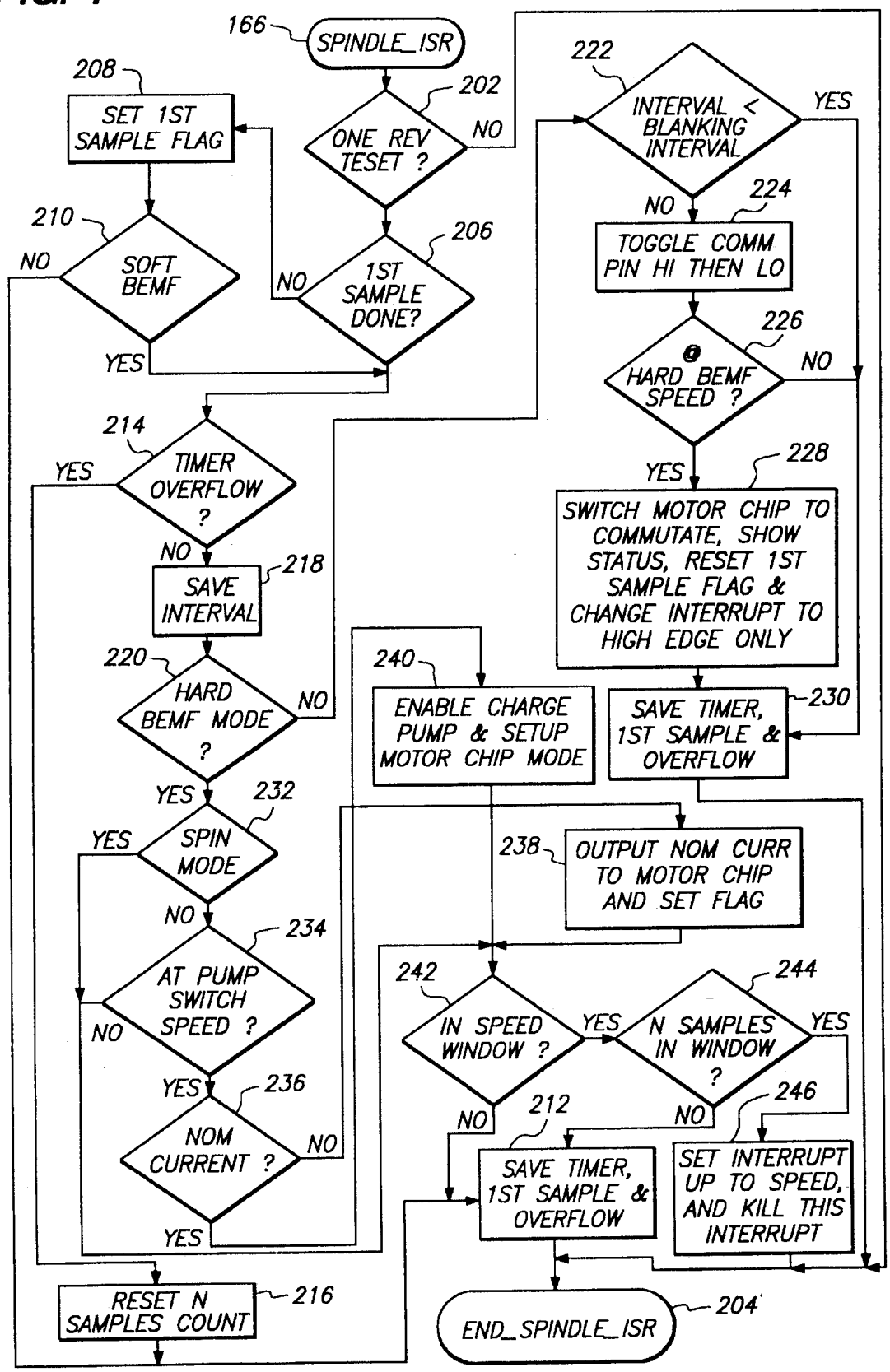
FIG. 7 is a flow chart of a spindle speed monitor interrupt service routine for monitoring motor speed in accordance with principles of the present invention.

FIG. 7 sets forth the spindle speed monitor interrupt service routine 166. After this routine 166 is called, a logical node 202 determines whether a one revolution test can be carried out. If not, a return is made at a return node 204. If so, a node 206 determines if a first speed sample is completed. If not, a step 208 sets a first sample flag, and a logical node 210 determines if the motor 10 is operating in the soft back-EMF mode 84. If not, meaning that the motor speed control lies solely with the motor controller 34, a step 212 saves the timer value representative of the speed measurement interval, and sets first sample and overflow flags, and the monitor routine ends at the node 204. If the operating mode is determined at the logical step 210 to be soft back-EMF, a node 214 determines if a timer overflow has occurred. If so, a block 216 resets a counter with a predetermined number of count samples to be acquired, and program flow passes to the step 212.

If the timer has not overflowed, as tested at the node 214, a step 218 saves a timer count snapshot value of the timing interval in a buffer location. A step 220 then determines if the operating mode is hard back-EMF. If not, meaning that the motor is operating in soft back-EMF, either in the operational mode 82 or mode 84, a logical node 222 determines if the interval snapshot is greater than a predetermined blanking interval. If not, meaning that the incoming commutation signal over the path 53 is valid, a step 224 causes the commutation line 51 to be toggled. A logical node 226 then determines if the motor's velocity has reached the hard back-EMF cutover speed at the beginning of mode 86 of FIG. 4. If so, a step 228 causes the motor controller chip 34 to begin self-commutation, sets status flags, resets a first sample flag, and changes an interrupt condition to a rising edge only. A step 230 then saves the timer value, the first sample value, and the overflow value in buffer memory, and a return is made at the node 204. The step 230 is also reached if the node 226 determines that the cutover speed to mode 86 has not yet been reached.

If it is determined that the motor controller 34 is operating in the hard back-EMF control mode at the step 220, a node 232 determines if the motor has reached its nominal velocity in the spin mode 86. If not, a node 234 determines if motor velocity is at a charge pump switch speed at which the charge pump 58 is effective for speed regulation. If so, a node 236 determines if the motor driver amplifiers 58 are operating at nominal current. If so, a step 240 closes the phase locked loop through the speed discriminator 54 by enabling the charge pump 56 by closing the switch 82 and opening the switch 80. Current control at the amplifiers 56 is now provided solely by the charge pump 56. If the node 236 determines that other than nominal current is being applied by the amplifiers 58, a step 238 puts out a nominal current to the DAC 72 and sets a nominal current flag.

A logical step 242 is reached either from the spin mode node 232, the pump switch speed node 234, the DAC control step 238 and the enable charge pump step 240, as shown in FIG. 7. In any of these events, the speed window determines if motor rotation is within a nominal speed window, such as within one percent (1%) of nominal rotational velocity. If not, step 212 is reached. If so, a node 244 determines if a predetermined number n of samples have occurred within the speed window. If so, a step 246 sets an up-to-speed interrupt value, and terminates the spindle speed monitor interrupt flag. Otherwise, step 212 is reached.

Figure 8:
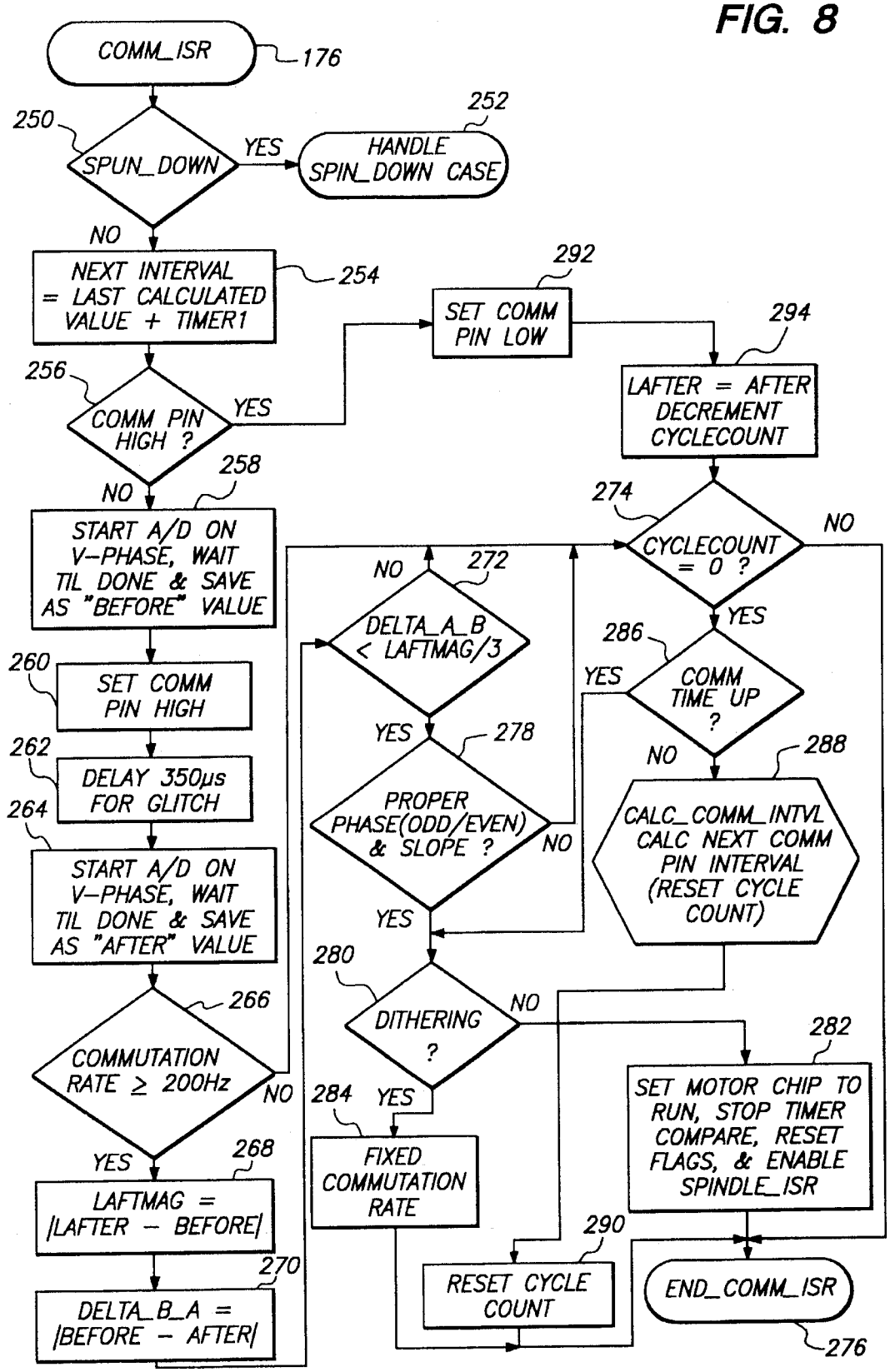
FIG. 8 is a flow chart of a commutation interrupt service routine for commutating the spindle motor during an initial start-up mode directly with microcontroller control in accordance with principles of the present invention.

FIG. 8 sets forth the commutation interrupt service routine 176. Upon entering this routine 176, a logical node 250 determines if the spin down case is true. The spin down case is used during commanded motor stop to allow a delay from braking the spindle motor 10 before putting the motor controller chip 34 into a powered-down sleep mode. If the spin down case is not true, then a process step 254 will take the interval value calculated during the last execution of the commutation interrupt service routine and sum it with a real-time value hardware timer (Timer 1) within the microcontroller 22, and then load the compare register in the microcontroller 22 with this sixteen bit value. At a step 256 a logical node tests for the logic state of the commutation pin 51 of the microcontroller 22. If the commutation pin 51 is low, a step 258 starts an analog to digital conversion of the Vphase signal. When the conversion is complete, the value is saved as a BEFORE value. The commutation pin 51 is then set to a logical high level at a step 260. At a step 262 a delay of approximately 350 microseconds is incurred to permit any glitch or noise occurring from the change in state of the commutation pin 51 to dissipate.

At a step 264 an analog to digital conversion is tarted on the Vphase signal and when the conversion is complete, the value is saved as an AFTER value. At a step 266 a logical node tests if the commutation rate is greater than or equal to a minimum rotational velocity threshold e.g. 200 Hertz. The purpose of this threshold is to assure that the back-EMF analog values on the Vphase line are adequate in order to make a reliable decision and determination of the cross-over point X in FIG. 4. If the commutation rate is above the threshold, a step 268 takes the absolute value of the difference between the values BEFORE and LAFTER and saves the difference as LAFMAG. A next step 270 takes the absolute value of the difference between the values BEFORE and AFTER and saves it as DELTA_B_A. A logical node 272 tests for the value DELTA_B_A being lest than a value of LAFMAG/3. This latter ratio was chosen to reflect the condition or quality of the Vphase signal which will indicate that the relationship of the commutation rate to changes in back-EMF are at or near the desired switch-over point X. A ratio was used in lieu of a fixed value for DELTA_B_A in order to make this test insensitive to the effects of RPM upon the range of value.

Figure 9:
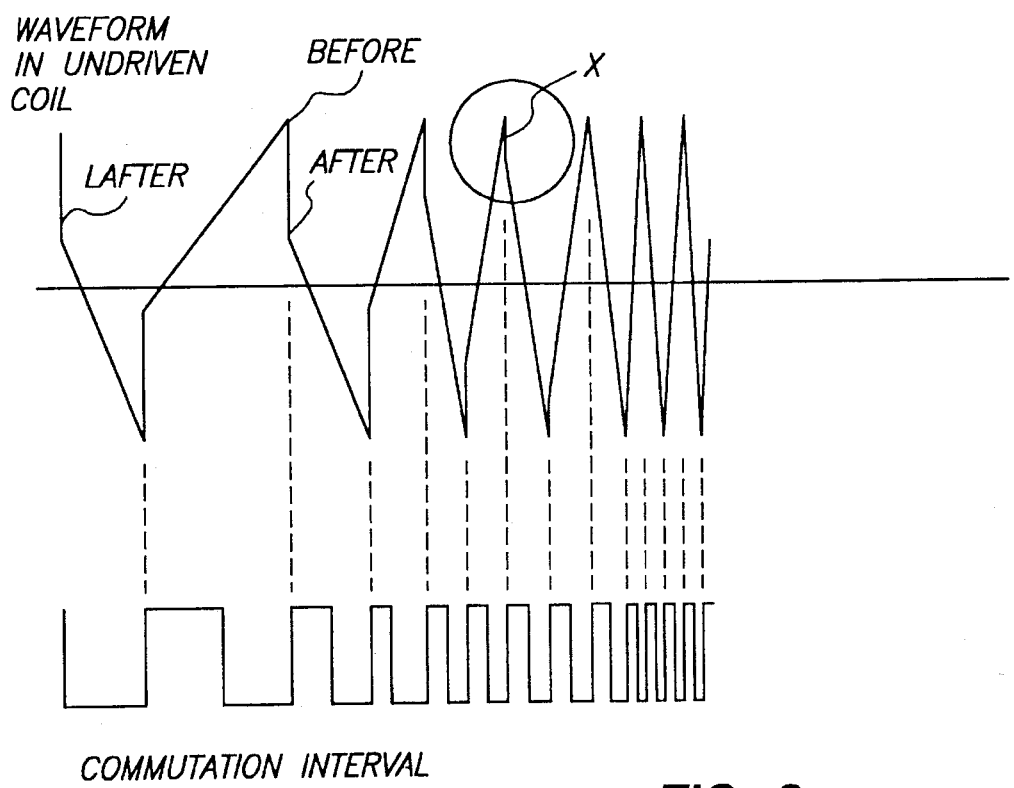
FIG. 9 is a series of interrelated graphs illustrative of aspects of the FIG. 8 commutation interrupt service routine.

If the step 272 indicated a true case (fall-through), a logical node 278 tests for the relationship of the slope of the Vphase signal (FIG. 9), and whether the total number of commutation states to this time are of an odd or even count. If the proper relationship between the slope and phase is true, a logical node 280 tests for a dithering condition being true, which would be an indicator of stuck spindle motor 10 or other difficulty-in-spinup issue. If the test at 280 was false, indicating the dithering condition is not true, the step at 282 will disable the use of timer compare logic, set the commutation pin 52 to a logical low condition, disable the activity of this commutation interrupt service routine 176 and enable the spindle interrupt service routine 166. The commutation interrupt service routine 176 is exited at a step 276.

If at node 256 the commutation pin 51 is high, then a step 292 sets the commutation pin 51 low. A step 294 will take the value AFTER and copy it to a variable labelled LAFTER. A logical node 274 will decrement and test if the value CYCLECOUNT is zero. The value CYCLECOUNT is a count of the number of intervals per cycle of logical events occurring on the commutation pin 51. This is set to two, the same interval value being used for the high and low duration of the commutation pin logic states. If the test at step 274 was true (CYCLECOUNT=0), a logical node 286 will test to see if the maximum time to apply the commutation ramp has been reached. This condition is determined by keeping a running sum of the commutation intervals. If the test at step 286 is true, and the time has expired, the process flow proceeds to the step 280, already explained above. If the test at node 286 was false and the total time has not expired, a next value of the interval to be loaded into the compare register of the microcontroller 22 during execution of the next commutation routine 176 is calculated at a calculation step 288 and saved. At this time a step 290 reloads CYCLECOUNT to 2 and the commutation interrupt service routine is exited at the step 276. The commutation interval decreases nonlinearly, as graphed in FIG. 4, segment L, and as shown in the commutation interval graph of FIG. 9.

If the commutation rate was below the e.g. 200 Hz threshold as tested at the node 266, flow proceeds to the CYCLECOUNT test step 274. If at step 280 the dithering condition was true, the step 284 maintains the commutation rate on the commuation pin 51 at a fixed rate for so long as the dithering condition is in effect. The commutation routine is again exited at the step 276.

The magnitude of the waveform induced in the undriven coil selected by the multiplexer 63 as differenced with the centertap potential CT by the differential amplifier 65 will change at the rising edge of cycle count, as a function of the amount of electrical phase lead of the rotor over the commutation signal. A significant phase lead, e.g. 15 electrical degrees, is illustrated in the left portion of the waveform of FIG. 9 at the vertical edge starting at the BEFORE label and ending at the AFTER label. As the linear ramp M of the motor approaches the nonlinear monotonic driving waveform M, the length of the vertical edge diminishes, as at X in FIG. 9.

The subroutine 288 calculates the commutation interval in accordance with the following relationships:

RATE=(t·RSLP)+RATE
F=(t·RATE)+F, where:
F is the present commutation frequency.
T is equal to 1/F (for calculation, 1=04444h)
RATE is equal to the acceleration of the slope L in Hz/Sec.
RSLP is the rate of acceleration in Hz/Sec/Sec and is calculated as beginning.
Ending RATE minus the Beginning RATE over total time ET is the desired Elapsed Time and is used to determine the slope L and to set the end of commutation generation.

An example is as follows:
Starting RATE=600 Hz, Ending RATE=2400 Hz
Desired Total Commutation Time=0.3 Seconds.
RSLP=(2400-600)/0.3 or 6000.

Note, in this example, INTERVAL is carried as FFFF/FREQ to simplify the mathematics, and ELAPSED T sums INTERVAL as described to limit the resultant value to a word (16 bits) in length.

As is apparent from the foregoing discussion, the present approach achieves a superior motor speed startup and control architecture e.g. for a disk drive with greater hardware simplicity and at lower cost than heretofore, by advantageously applying an optimized balance of hardware and firmware. During nominal operation, the motor controller 34 autonomously commutates the brushless DC motor 10 on the basis of sensed back-EMF without intervention of the microcontroller 22. Before startup, the microcontroller 22 senses rotor position by uniquely commanding commutation sequences and minimal driving currents. Once rotor position is determined, an initial non-linear commutation ramp L is commanded by the microcontroller 22 in open-loop fashion by toggling of the commutation line 51. After a cross-over point X is reached, the microcontroller 22 continues to commutate the motor 10, based upon qualified back-EMF pulses received from the phase selector circuit 62 over the digital path 53 during the soft back-EMF mode 84. In this soft back-EMF mode 84, the digital microcontroller is acting as a digital low pass filter within the motor speed control loop.

Once a predetermined velocity is reached, which may be about 20 percent of nominal rotational velocity in the present example of a small eight pole, nine gap brushless DC motor intended to rotate 2.5 inch diameter disks, the hard back-EMF mode 86 is reached. During this mode, the commutation of the motor 10 is controlled by the phase selector 62 and the commutation control logic 60, while the microcontroller 22 continues actively to monitor the motor velocity ramp as graphed in FIG. 4 for example. Once the motor speed reaches a range close to nominal speed, the charge pump 56 is enabled, and the motor speed control loop is closed through the speed feedback multiplexer 76 which provides actual motor speed, the motor clock divisor circuit 52 which provides nominal speed, the speed discriminator 54 which compares actual and nominal speed values and the charge pump 56 which is caused to charge up or down by the speed discriminator 54.

The microcontroller 22 then may position the actuator 36 to reserved data track locations and retrieve other firmware routines needed for subsequent control of disk drive functions. Periodically, the microcontroller monitors motor speed, by virtue of the servo sectors S and the servo detector circuit 46. If a spindle speed discrepancy is noted, a reset of the motor speed controller chip 34 is commanded.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A multi-mode control method for controlling startup of a polyphase brushless DC motor comprising the steps of:

determining with a programmed digital microcontroller an angular position of a rotor of the DC motor having a first plurality of permanent magnets and magnetic poles, and a stator having a core defining a second plurality of pole segments generally facing the magnetic poles and phase windings formed around the pole segments during a first operational mode, generating an initial commutation sequence characterized by a non-linear commutation ramp for the phase windings of the DC motor with the programmed digital controller based upon determined angular position of the rotor, applying the initial commutation sequence to the phase windings to start rotation of the rotor in a forward direction, without reverse rotation, with rotor angular position leading electrical phase angle of the initial commutation sequence, monitoring back-EMF induced in the phase windings to determine rotor angular position relative to the initial commutation sequence to determine a cross-over between rotor angular position and electrical phase angle of the initial commutation sequence during a second operational mode, and generating a back-EMF commutation sequence with a motor controller from monitored back-EMF and commutating the motor with the back-EMF commutation sequence following the cross-over, during a third operational mode.

2. The multi-mode control method set forth in claim 1 wherein the programmed digital microcontroller qualifies the back-EMF commutation sequence during an initial portion of the third operational mode, until a predetermined rotational velocity is reached, whereupon the programmed digital microcontroller ceases to qualify the commutation control to the motor controller.

3. The multi-mode control method set forth in claim 1 wherein the step of determining the angular position of the rotor is carried out by the steps of generating a sequence of pulses with the programmed digital microcontroller, sequentially applying the pulses to selected ones of the windings and sequentially measuring differential inductive coupling between the selected ones of the windings and selected others of the windings without rotating the rotor.

4. The multi-mode control method set forth in claim 1 wherein the step of determining the angular position of the rotor by the steps of:

sequentially applying with the programmed digital microcontroller a driving current pulse at a power level below a level overcoming starting friction of the rotor successively and bidirectionally to each of the windings as a driven winding during a driving interval, sequentially measuring with an analog to digital conversion means and the programmed digital microcontroller during a measuring interval immediately following the driving interval a response induced at a selected undriven winding of the core via inductive coupling of the stator core between the driven winding and the undriven winding, and determining with the programmed digital microcontroller the position of the rotor relative to the stator by identifying a driven winding and a current direction manifesting a lowest amplitude response in the selected undriven winding.

5. A multi-mode control method for controlling startup of a polyphase brushless DC motor comprising the steps of:

determining with a programmed digital microcontroller the angular position of a rotor of the DC motor having a first plurality of permanent magnets and magnetic poles, and a stator having a core defining a second plurality of pole segments during a first operational mode by the steps of:

sequentially applying with the programmed digital microcontroller a driving current pulse at a power level below a level overcoming starting friction of the rotor successively and bidirectionally to each of the windings as a driven winding during a driving interval, sequentially measuring with an anolog-to-digital conversion means and the programmed digital microcontroller during a measuring interval immediately following the driving interval a response induced at a selected undriven winding of the core via inductive coupling of the stator core between the driven winding and the undriven winding, and determining with the programmed digital microcontroller the position of the rotor relative to the stator by identifying a driven winding and a current direction manifesting a lowest amplitude response in the selected undriven winding, generating an initial commutation sequence characterized by a non-linear commutation ramp for the phase windings of the DC motor with the programmed digital controller based upon determined angular position of the rotor in order to start rotation of the rotor in a forward direction without reverse rotation, applying the initial commutation sequence to the phase windings, monitoring back-EMF induced in the phase windings to determine rotor angular position relative to the initial commutation sequence to determine a cross-over between rotor angular position and electrical phase angle of the initial commutation sequence, during a second operational mode, generating a back-EMF commutation sequence with a motor controller from monitored back-EMF following the cross-over, including qualifying the back-EMF commutation sequence with the programmed digital microcontroller during a third operational mode until a predetermined rotational velocity is reached, and generating a back-EMF commutation sequence with the motor controller from monitored back-EMF without qualification by the programmed digital microcontroller after the predetermined rotational velocity is reached, during a forth operational mode.

6. A method for determining the angular position of a rotor of a polyphase brushless DC motor for enabling startup in a forward direction of rotation without any reverse rotation, the motor including a rotor having a plurality of permanent magnets and magnetic poles and a stator having a core defining a different plurality of pole segments generally facing the magnetic poles and phase windings around the pole segments, the core becoming nearly saturated by the presence of magnetic fields emanating from the magnetic poles in the absence of any driving currents in the windings, comprising the steps of:

sequentially applying a driving current pulse at a power level below a level overcoming starting friction of the rotor successively and bidirectionally to each of the windings as a driven winding during a driving interval thereby selectively to increase or decrease the level of magnetic saturation in the core, sequentially measuring during a measuring interval immediately following the driving interval a response induced at a selected undriven winding of the core via inductive coupling of the stator core between the driven winding and the undriven winding, the response being an inverse function of saturation level of the core, and determining rotor position relative to the stator by identifying a driven winding and a current direction manifesting a lowest amplitude response in the selected undriven winding.

7. The method set forth in claim 6 wherein the step of sequentially measuring comprises the steps of digitally selecting the undriven winding, and coupling an analog to digital conversion means to the undriven winding during the measuring interval, and converting the response induced in the undriven winding into a digital value.

8. The method set forth in claim 7 wherein the determining step comprises recording each of the digital values in memory locations, and identifying the recorded digital value having the lowest absolute magnitude.

9. A control method for controlling startup of a polyphase brushless DC motor having a movable rotor and phase windings, the method comprising the steps of generating an initial commutation sequence characterized by a non-linear commutation ramp for the phase windings of the DC motor with a programmed digital controller and a motor controller in order to start rotation of the rotor in a forward direction with rotor angular position leading electrical phase angle of the initial commutation sequence, applying the initial commutation sequence to the phase windings, monitoring back-EMF induced in the phase windings to determine rotor phase lead to determine convergence of rotor phase with an electrical phase angle of the commutation sequence and thereupon generating a back-EMF commutation sequence with the motor controller from monitored back-EMF and commutating the motor with the back-EMF commutation sequence following convergence.

* * * * *